Feb. 19, 1924.

A. G. BOWEN 1,483,865

MEANS FOR LUBRICATING INCASED UNIVERSAL JOINTS

Filed April 21, 1919

Inventor:
Adna Guernsey Bowen.

Patented Feb. 19, 1924.

1,483,865

UNITED STATES PATENT OFFICE.

ADNA GUERNSEY BOWEN, OF MEDINA, NEW YORK.

MEANS FOR LUBRICATING INCASED UNIVERSAL JOINTS.

Application filed April 21, 1919. Serial No. 291,660.

*To all whom it may concern:*

Be it known that I, ADNA GUERNSEY BOWEN, a citizen of the United States of America, residing at Medina, in the county of Orleans and State of New York, have invented a new and useful Improvement in Means for Lubricating Incased Universal Joints, of which the following is the specification.

My invention has for its object the continuous automatic lubrication of incased universal joints and the like, and parts connected therewith, and particularly the forward universal joint on automobile drive shafts immediately following the gear box, by the utilization of the reciprocating movement of one of the members of the universal joint in connection with valves suitably located, to effect a partial vacuum within the casing enclosing the universal joint, whereby the lubricant is drawn into the interior of the casing from the source of supply without the casing.

In the accompanying drawing, I have, for the purpose of illustration, shown one embodiment of my invention.

The different parts will be hereinafter referred to and identified by letters as follows; A, main drive shaft from gear box or transmission case; B, propeller shaft; C, one of the members of the universal joint; D, another of the members of the universal joint, functioning also as the reciprocating member; E, intermediate member of the universal joint; F, casing or housing incasing universal joint; G, closure for casing or housing F; H, valve in member D; I, valve in member B; J, longitudinal opening in member A; K, longitudinal opening in member D; L, packing between parts F and G; M, packing between parts B and G.

Figure 1:
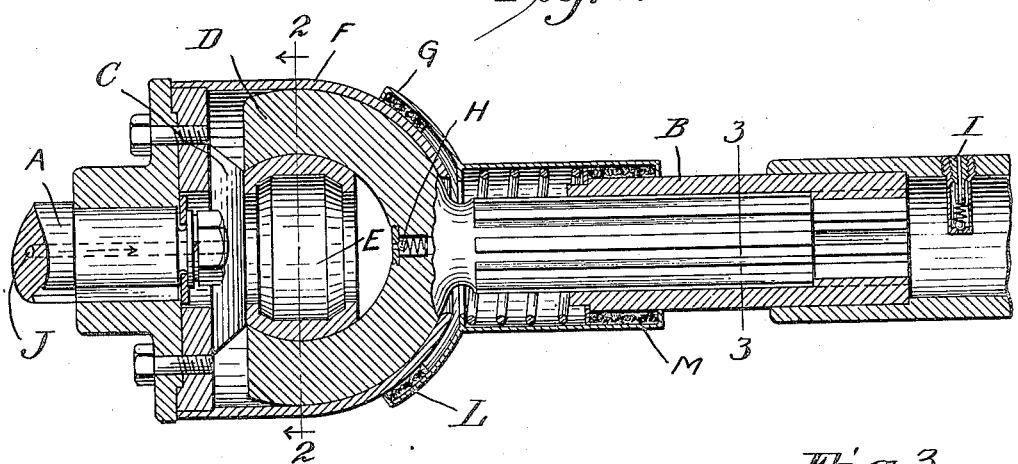
Figure 1, is a longitudinal section of the latest and most approved type of enclosed universal joint one member of which has a reciprocatory movement of the kind generally found on automobiles immediately following the gear box, equipped with my invention.
Figure 2:
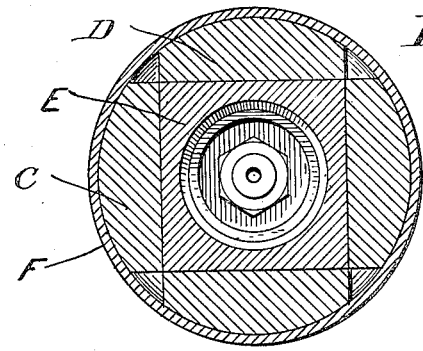
Figure 2, is a cross section thereof on the line 2—2.
Figure 3:
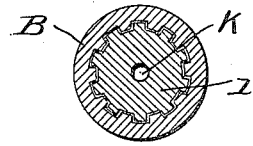
Figure 3, is a cross section thereof on the line 3—3.
Figure 4:
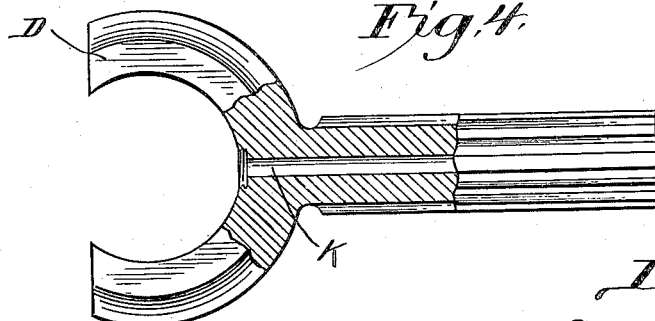
Figure 4, is a plan view, partially in section, of the reciprocating member shown in Figure 1, with valve removed, showing longitudinal opening through center.

By referring to the drawing it will be seen that the main drive shaft A, is provided with a longitudinal opening J, connecting it with the gear box or other reservoir containing the lubricant which may be led into it by any suitable means. Also that the propeller shaft B, is tubular, and the reciprocating end of the member D, telescopes within it as shown in Figure 1. Also that the member D, is provided with a longitudinal opening K, and that located therein is the valve H, which closes when the parts B and D telescope, and opens when the movement is reversed. Also that the propeller shaft B, has the valve I, which opens against pressure from within and closes when such pressure is removed. Also that the enclosing casing or housing F, and the closure G, has interposed between them suitable packing L, and that similar packing M, is interposed between the parts B and G, which under normal conditions seals the parts against the passage of oil or air.

It has been found in practice however, that hitherto an abnormal condition has been produced in this class of universal joints tending to force the limited amount of lubricant within the casing to be driven out between the parts F and G, and thus lost without any equivalent replacement, owing to several causes; first, by heating, causing the lubricant to become more fluid and the air to expand and drive it out; second, through the action of centrifugal force, tending to drive the lubricant away from the center and cause it to seek an outlet between the parts F and G, which in many joints of this class have a very large opening, and third, through the alternate compression and rarefication of the air within the casing by the reciprocatory action of member D: all of which, severally and collectively, soon deplete the casing of its lubricant.

Now however, by my improved construction, this abnormal condition is overcome, and the reciprocatory movement of the parts B and D is made to perform a useful service, for it will be obvious to one skilled in the art, that the reciprocatory movement, in connection with the valves H and I, properly set, will tend to create a vacuum within the enclosing casing or housing F—G, which will only be relieved by the flow of lubricant from the source of supply or by leakage past the packing L—M, and that in this manner the parts will be continuously automatically lubricated until the supply is exhausted; and the tendency of the lubricant to ooze past the packing L—M will be greatly lessened, if not entirely stopped.

While I have herein shown and particularly described one embodiment of my invention as applied to the most advanced type of incased universal joint having a member with reciprocatory motion, and my construction has especial reference to such incased type, it is to be understood that this embodiment is shown for the purpose of illustration, and that the invention may be modified to assume other forms or the valves shown may be otherwise disposed, so long as such reciprocating movement actuating such valves tends to create a vacuum within the casing or housing F—G, without departing from the spirit of my invention.

Having thus described my invention, its utility and mode of operation, what I claim and desire to secure by Letters Patent, is:—

1. In an incased universal joint, one member of which has a reciprocating movement, means whereby such movement shall tend to create a vacuum within the casing of such universal joint, and thereby to draw lubricant into the casing from a source of supply, substantially as described.

2. In an incased universal joint, one member of which has a reciprocating movement, of openings and valves so disposed in said mechanism as will tend to create a vacuum within the casing of such universal joint, and thereby to draw lubricant into the casing from a source of supply, substantially as described.

3. In an incased universal joint, one member of which has a reciprocating movement, in combination with a main drive shaft and a propeller shaft having an endwise or reciprocating movement, of openings and valves so disposed with relation to said member and shafts as to tend to create a vacuum within the casing of said universal joint by reason of such reciprocatory movement, and thereby to draw lubricant into the casing from a source of supply, substantially as described.

4. In an incased universal joint, one member of which has an endwise or reciprocatory movement on or within one or the other of the shafts in operative engagement therewith, in combination with such shafts, of openings and valves so disposed in such mechanism and in relation to said parts as to tend to create a vacuum within the casing of said universal joint by reason of such reciprocatory movement, and thereby to draw lubricant into the casing from a source of supply, substantially as described.

5. In an incased universal joint, one member of which is in reciprocatory engagement with a communicating revolving shaft capable of endwise movement, of such shaft, openings and valves suitably disposed with relation to said member, shaft and casing, as to tend to produce a vacuum within the casing of such universal joint by reason of the reciprocatory movement of such shaft and member, and thereby to draw lubricant into the casing from a source of supply, substantially as described.

6. In an incased universal joint of the character described, of a member capable of reciprocatory movement on or within a revolving shaft therewith operatively connected, such shaft, openings and valves so disposed in such casing, member and shaft as to tend to create a vacuum within the casing of such universal joint by reason of the action of such reciprocatory member and shaft; of a receptacle for holding lubricant located without the casing of such universal joint, means of connecting said receptacle with the interior of such casing, whereby such lubricant will be drawn into such casing by the difference in atmospheric pressure caused by such vacuum.

7. In an incased universal joint of the character described, of the means herein described for creating within the casing of such universal joint of a rarefied condition of the air, of a suitable source of supply of lubricant located outside of said incased universal joint, of means for connecting such source of supply of lubricant with the interior of said casing, whereby the action thereof will cause such lubricant to flow from such source to the interior of such casing, substantially as described.

ADNA GUERNSEY BOWEN.